(12) United States Patent
Hamada

(10) Patent No.: US 8,242,700 B2
(45) Date of Patent: Aug. 14, 2012

(54) BACKLIGHT UNIT

(75) Inventor: Tetsuya Hamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 388 days.

(21) Appl. No.: 12/599,533

(22) PCT Filed: Feb. 27, 2008

(86) PCT No.: PCT/JP2008/053374
§ 371 (c)(1),
(2), (4) Date: Nov. 10, 2009

(87) PCT Pub. No.: WO2009/008190
PCT Pub. Date: Jan. 15, 2009

(65) Prior Publication Data
US 2010/0237801 A1    Sep. 23, 2010

(30) Foreign Application Priority Data
Jul. 6, 2007   (JP) ................. 2007-177964

(51) Int. Cl.
*H05B 37/00*   (2006.01)

(52) U.S. Cl. .............. 315/185 R; 315/193; 315/307; 315/308

(58) Field of Classification Search ............. 315/185 R, 315/192, 193, 291, 307, 308
See application file for complete search history.

(56) References Cited

U.S. PATENT DOCUMENTS
2008/0116818 A1*  5/2008  Shteynberg et al. ......... 315/192

FOREIGN PATENT DOCUMENTS

| JP | 63-68887 A | 3/1988 |
|---|---|---|
| JP | 63-70283 A | 3/1988 |
| JP | 9-169134 A | 6/1997 |
| JP | 2004-235070 A | 8/2004 |
| JP | 2007-42758 A | 2/2007 |
| JP | 2007-59282 A | 3/2007 |
| JP | 2007-141715 A | 6/2007 |

* cited by examiner

*Primary Examiner* — David Hung Vu
(74) *Attorney, Agent, or Firm* — Birch, Stewart, Kolasch & Birch, LLP

(57) ABSTRACT

A backlight unit that realizes stabilization of lighting operation in the event of carrying out lighting operation at low luminance. The backlight unit is backlight unit (10) comprising a light source composed of multiple light emitting diode groups (4a, 4b, 31a, 31b, 31c, 31d) each including a given number of serially connected light emitting diodes (4,31); and lighting circuit (20, 40) for lighting the light source in accordance with a light control signal. The lighting circuit has at least multiple drive circuit portions (21a, 21b, 41a, 41b, 41c, 41d) respectively connected to the multiple light emitting diode groups, and in accordance with a light control signal, allows all the light emitting diodes included in each of the multiple light emitting diode groups to emit light, or allows only light emitting diodes included in light emitting diode group(s) selected from among the multiple light emitting diode groups to emit light.

4 Claims, 9 Drawing Sheets

LIGHT CONTROL SIGNAL

BACKLIGHT UNIT

TECHNICAL FIELD

The present invention relates to a backlight unit, and in particular, to a backlight unit using a plurality of light emitting diodes as a light source.

BACKGROUND ART

LED (light emitting diode) drive units for driving a plurality of serially-connected LEDs have conventionally been known (see, for example, Patent Document 1). Backlight units provided with, for example, such LED drive units have also been conventionally known.

FIG. 9 is a plan view schematically showing an example of the structure of a conventional backlight unit. FIG. 10 is a diagram for illustrating the structure of a light source of the conventional backlight unit shown in FIG. 9. FIG. 11 is a diagram for illustrating the structure of a lighting circuit connected to the light source of the conventional backlight unit shown in FIG. 9. First, with reference to FIGS. 9 to 11, a description will be given of an example of the structure of a conventional backlight unit.

In the conventional backlight unit 110, as shown in FIG. 9, a light guide plate 101, a light source (a plurality of LEDs 102), and the like are accommodated inside a backlight frame 103. Although not illustrated, a reflection sheet and an optical sheet are also accommodated inside the backlight frame 103.

The plurality of LEDs 102 forming the light source are mounted on a given substrate 104. Furthermore, the plurality of LEDs 102 are arranged at predetermined intervals in a direction (direction A) along a light entrance surface 101a of the light guide plate 101 such that each of the LEDs 102 faces the light entrance surface 101a of the light guide plate 101.

As shown in FIG. 10, as well as being serially connected, the plurality of LEDs 102 are structured such that they emit light by being fed with a drive current from the lighting circuit 120. The lighting circuit 120 feeding the plurality of LEDs 102 with a drive current, as shown in FIG. 11, has one constant current circuit portion 121 and one light control portion 122. The constant current circuit portion 121 has a function of generating a predetermined constant current. The light control portion 122 has a function of regulating the amount of drive current fed to the plurality of LEDs 102 (see FIG. 10) according to a light control signal fed from outside.

Lower-brightness lighting operation can be performed with the above-described conventional backlight unit 110 than with a conventional backlight unit using a CCFT (cold cathode fluorescent tube) as the light source. Incidentally, the LEDs 102 emit light with a current equal to or less than a several percent (for example, approximately 1%) of a rated current.

Patent Document 1: JP-A-2007-42758

DISCLOSURE OF THE INVENTION

Problems to be Solved by the Invention

With the above-described conventional backlight unit 110, when the drive current fed to the LEDs 102 is decreased to a several percent (for example, approximately 1%) of the rated current or less to perform low-brightness lighting operation, the drive current fed from the lighting circuit 120 inconveniently contains electrical noise, or the waveform of the drive current fed from the lighting circuit 120 is inconveniently deformed, which will invite the following problem. That is, in performing low-brightness lighting operation with the above-described conventional backlight unit 110, it is difficult for the lighting circuit 120 to stably output a drive current which is several percent of the rated current or less, and this results in unstable lighting operation.

For example, assuming that the drive current fed to the LEDs 102 in high-brightness lighting operation is approximately 150 mA (light control signal: 100%) and that the drive current contains electrical noise of approximately ±1 mA, the drive current actually fed to the LEDs 102 is approximately 149 to 151 mA. In this case, the electrical noise can be said to have hardly any negative effect on the lighting operation.

On the other hand, assuming that the drive current fed to the LEDs 102 in low-brightness lighting operation is approximately 1.5 mA (light control signal: 1%), and that the drive current contains electrical noise of approximately ±1 mA, the drive current actually fed to the LEDs 102 is approximately 0.5 to 2.5 mA. In this case, the drive current actually fed to the LEDs 102 changes by up to approximately five times, and this results in unstable lighting operation.

The present invention has been made to solve the above-described problems, and an object of the invention is to provide a backlight unit allowing stable low-brightness lighting operation.

Means for Solving the Problem

To achieve the above object, according to one aspect of the present invention, a backlight unit is provided with: a light source formed with a plurality of light emitting-diode groups each including a predetermined number of serially-connected light emitting diodes; and a lighting circuit that is connected to the light source to light the light source according to a light control signal fed from outside. Here, the lighting circuit at least has a plurality of drive circuit portions individually connected to the plurality of light emitting-diode groups, and the lighting circuit is so configured as to make, according to the light control signal, all light emitting diodes included in the plurality of light emitting-diode groups or only light emitting diodes included in a predetermined light emitting-diode group of the plurality of light emitting-diode groups emit light.

With the backlight unit according to the one aspect of the present invention described above, by using the lighting circuit that at least has the plurality of drive circuit portions individually connected to the plurality of light emitting-diode groups, the plurality of light emitting-diode groups can be driven independently of one another. This makes it possible to make all the light emitting diodes included in the plurality of light emitting-diode groups emit light, and to make only light emitting diodes included in a predetermined one of the plurality of light emitting-diode groups emit light. This makes it possible to stabilize lighting operation when lighting operation is performed at low brightness. A specific description will be given below of advantages of the backlight unit according to the one aspect of the present invention. Incidentally, in the following description, it is assumed that two light emitting-diode groups are provided. In the following description, it is also assumed that a maximum-brightness state is a 100%-brightness state and that lighting operation can be stably performed if the light control signal is approximately 1.4% or more.

That is, if, in the case in which the light control signal is approximately 1.4%, only the light emitting diodes included in one of the two light emitting-diode groups are made to emit light, then only half of all the light emitting diodes forming the light source emit light and the other half of the light emitting diodes stop emitting light. Thus, in the case in which the light control signal is approximately 1.4%, it is possible to make light amount of the light source approximately 0.7%. Thus, low-brightness lighting operation can be stably performed until the light amount of the light source reaches approximately 0.7%. Incidentally, with the conventional configuration shown in FIGS. 9 to 11, since it is impossible to make only predetermined light emitting diodes of all the light emitting diodes forming the light source emit light, if the light control signal is approximately 1.4%, the light amount of the light source is also approximately 1.4%. And, if the light amount of the light source is reduced to approximately 0.7%, it is difficult to perform stable lighting operation.

In the backlight unit according to the above-described one aspect of the present invention, it is preferable that the plurality of light emitting-diode groups be configured to be driven independently of one another. This configuration makes it easy to make all the light emitting diodes included in the plurality of light emitting-diode groups emit light and to make only the light emitting diodes included in a predetermined light emitting-diode group of the plurality of light emitting-diode groups emit light.

In the backlight unit according to the above-described one aspect of the present invention, it is preferable that the lighting circuit further have a comparator portion comparing the light control signal with a preset threshold, and that the lighting circuit be so configured as to make, according to a result of comparison between the light control signal and the threshold, all light emitting diodes included in the plurality of light emitting-diode groups or only light emitting diodes included in a predetermined light emitting-diode group of the plurality of light emitting-diode groups emit light. This configuration makes it easy to judge whether to make all the light emitting diodes included in the plurality of light emitting-diode groups to emit light or to make only the light emitting diodes included in a predetermined light emitting-diode group of the plurality of light emitting-diode groups to emit light.

In the backlight unit according to the above-described one aspect of the present invention, it is preferable that light emitting diodes included in one light emitting-diode group of the plurality of light emitting-diode groups be so configured as to continuously emit light regardless of the light control signal In this case, it is preferable that the light emitting diodes be classified into a low-brightness light emitting diode and a high-brightness light emitting diode having emission brightness higher than emission brightness of the low-brightness light emitting diode, and that the light emitting diodes that are included in the one light emitting-diode group of the plurality of light emitting-diode groups and that are so configured as to continuously emit light be each the low-brightness light emitting diode. With this configuration, in performing lighting operation at low brightness, the light amount of the light source can be further reduced by making only the light emitting diodes (low-brightness light emitting diodes configured to continuously emit light) included in the light emitting-diode group of the plurality of light emitting-diode groups emit light.

In the backlight unit according to the above-described one aspect of the present invention, it is preferable that the plurality of light emitting-diode groups be arranged such that light emitting diodes included in the plurality of light emitting-diode groups are arranged by turns in a predetermined direction. With this configuration, in a case in which only light emitting diodes included in a predetermined light emitting-diode group of the plurality of light emitting-diode groups are made to emit light, it is possible to prevent it from happening that light emitting diodes emitting light are concentratedly disposed in a certain location. This helps prevent non-uniformity from occurring in brightness.

Advantages of the Invention

As described above, according to the present invention, it is possible to easily obtain a backlight unit allowing lighting operation to be stabilized in a case in which the lighting operation is performed at low brightness.

LIST OF REFERENCE SYMBOLS 4, 31 LEDs (light emitting diodes)
4a, 4b, 31a, 31b, 31c, 31d LED groups (light emitting-diode groups)
20, 40 lighting circuits
21a, 21b, 41a, 41b, 41c, 41d drive circuit portions
24, 44 comparator portions

BEST MODE FOR CARRYING OUT THE INVENTION (First Embodiment)

First, with reference to FIGS. 1 to 4, descriptions will be given of the structure of a backlight unit according to a first embodiment and that of a liquid crystal display device including the backlight unit.

Figure 1:
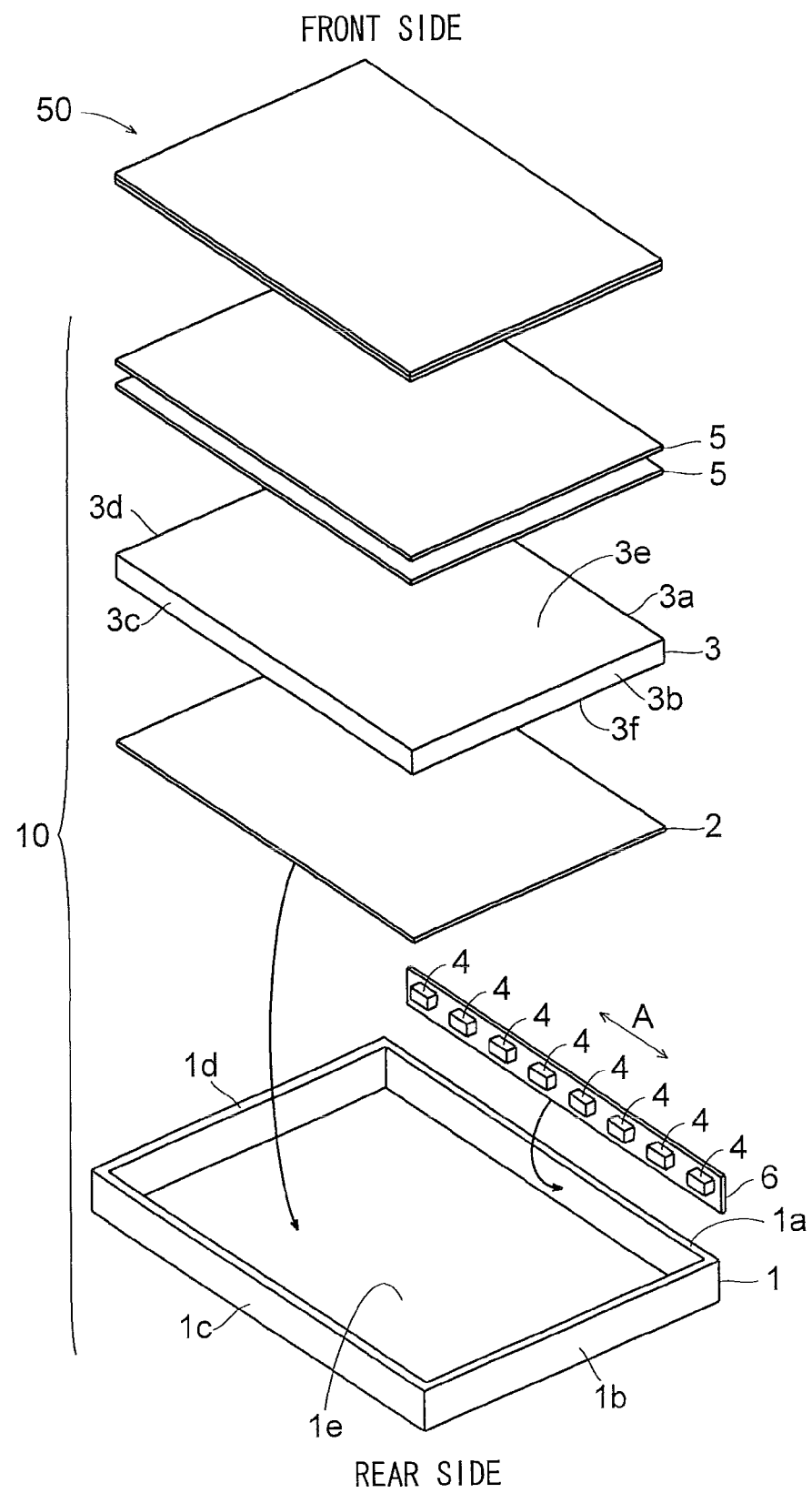
FIG. 1 is an exploded perspective view showing the structure of a liquid crystal display device including a backlight unit according to a first embodiment of the present invention.

As shown in FIG. 1, the liquid crystal display device including the backlight unit 10 of the first embodiment is used in a state in which the backlight unit 10 is disposed on a rear side of a liquid crystal display panel 50. And the backlight unit 10 of the first embodiment is designed to emit surface light toward the liquid crystal display panel 50 from the rear side of the liquid crystal display panel 50. A detailed description will be given below of the structure of the backlight unit 10 of the first embodiment.

Figure 2:
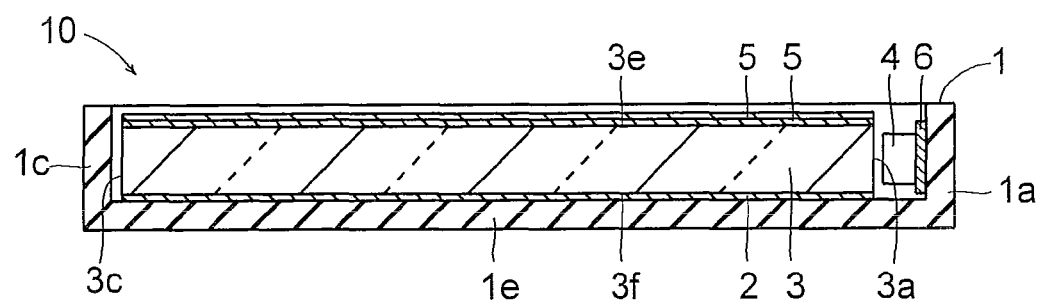
FIG. 2 is a sectional view showing the backlight unit according to the first embodiment shown in FIG. 1.

As shown in FIGS. 1 and 2, the backlight unit 10 of the first embodiment is provided at least with a backlight frame 1, a reflection sheet 2, a light guide plate 3, a light source formed with a plurality of LEDs (light emitting diodes) 4, and a plurality of optical sheets 5.

The backlight frame 1 is made of a white plastic or the like, and has four side portions 1a to 1d connected in a frame shape and a bottom portion 1e disposed behind the frame body composed of the four side portions 1a to 1d. And members (the reflection sheet 2, the light guide plate 3, the LEDs 4, and the optical sheets 5) forming the above-described backlight unit 10 are held in a region (an accommodation region) surrounded by the four side portions 1a to 1d of the backlight frame 1. Specifically, the reflection sheet 2, the light guide plate 3, and the optical sheets 5 are sequentially placed one on another in this order on the bottom portion 1e of the backlight frame 1. The LEDs 4 are fitted to the side portion 1a of the backlight frame 1.

The reflection sheet 2 is a formed with, for example, a resin sheet member capable of reflecting light, and so disposed as to cover a rear surface 3f of the light guide plate 3, which will be described later. With the provision of the reflection sheet 2, even if light is emitted toward a rear side from the rear surface 3f of the light guide plate 3, the light is reflected on the reflection sheet 2. This makes it possible for the light emitted toward the rear side from the rear surface 3f of the light guide plate 3 to be reintroduced into the light guide plate 3.

The light guide plate 3 is formed with a transparent member formed with a transparent resin, and has at least four side surfaces 3a to 3d. In a state in which the light guide plate 3 is accommodated inside the backlight frame 1, the four side surfaces 3a to 3d of the light guide plate 3 are arranged along the four side portions 1a to 1d, respectively, of the backlight frame 1. And the side surface 3a of the light guide plate 3 disposed along the side portion 1a of the backlight frame 1 functions as a light entrance surface through which light generated in the LEDs 4 is introduced into the light guide plate 3. In the following description, the side surface 3a will be referred to as a light entrance surface 3a.

In addition, the light guide plate 3 has one front surface 3e and one rear surface 3f as well. The front surface 3e of the light guide plate 3 functions as a light emission surface through which light introduced into the light guide plate 3 is emitted towards a front side (liquid crystal display panel 50 side). In the following description, the side surface 3e will be referred to as a light emission surface 3e. The provision of the light guide plate 3 makes it possible to make light generated in the LEDs 4 travel toward the front side (liquid crystal display panel 50 side).

The plurality of LEDs 4 forming the light source are arranged in one line at predetermined intervals in a direction (direction A) along the light entrance surface 3a of the light guide plate 3 such that each of the LEDs 4 faces the light entrance surface 3a of the light guide plate 3. The plurality of LEDs 4 are mounted on a same LED substrate 6. And the LED substrate 6 on which the plurality of LEDs 4 are mounted is adhered to the side portion 1a of the backlight frame 1 with a double-faced tape (not shown) or the like.

The plurality of optical sheets 5 include a diffusion sheet, a prism sheet, and the like. The plurality of optical sheets 5 perform diffusion and the like of light emitted from the light emission surface 3e of the light guide plate 3.

Incidentally, although not illustrated, a member having a function of, for example, pressing the optical sheets 5 from a front side is provided on the front side of the optical sheets 5. This member may be integrally formed with the backlight frame 1, or may be fitted to the backlight frame 1 after the backlight frame 1 is formed.

Figure 3:
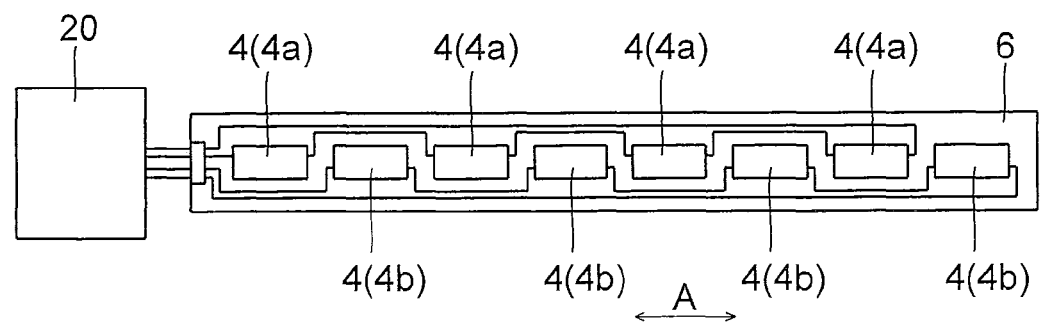
FIG. 3 is a diagram for illustrating the structure of a light source of the backlight unit according to the first embodiment shown in FIG. 1.

Here, in the first embodiment, as shown in FIG. 3, the plurality of LEDs 4 forming the light source are classified into two LED groups (light emitting-diode groups) 4a and 4b. These two LED groups 4a and 4b each include a predetermined number of serially-connected LEDs 4. And the two LED groups 4a and 4b are arranged such that the LEDs 4 included in the two LED groups 4a and 4b are alternately arranged in the direction A. That is, the LEDs 4 of the LED group 4a and those of the LED group 4b appear to be arranged in a nested state.

In addition, although the plurality of LEDs 4 of the first embodiment are of a type, they are not uniform in brightness of emission light. That is, the plurality of LEDs 4 can be classified into low-brightness LEDs 4 and high-brightness LEDs 4 having emission brightness that is higher than emission brightness of the low brightness LEDs 4. And, in the first embodiment, the LED group 4a is composed of a predetermined number of low-brightness LEDs 4 and the LED group 4b is composed of a predetermined number of high-brightness LEDs 4.

Figure 4:
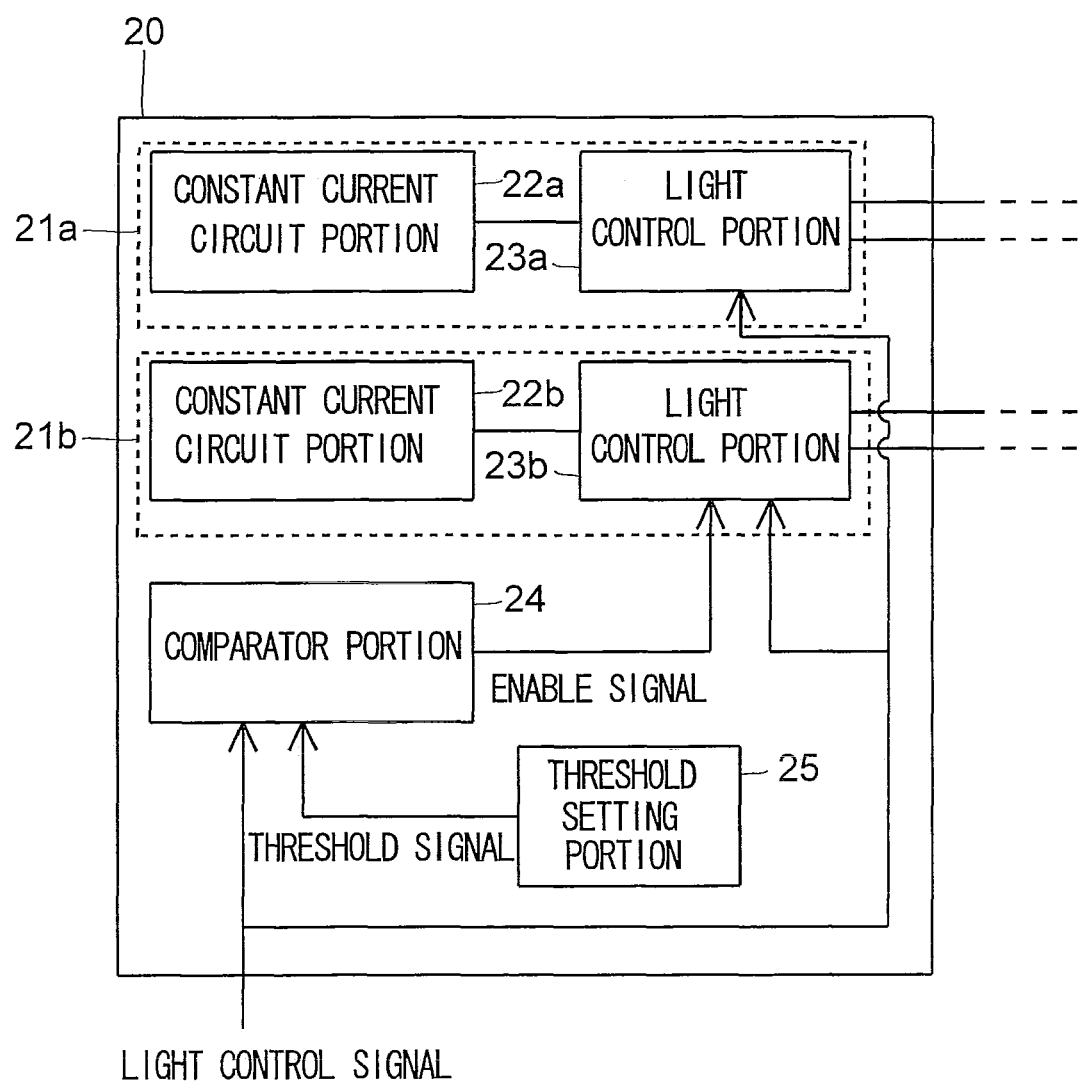
FIG. 4 is a diagram for illustrating the structure of a lighting circuit connected to the light source of the backlight unit according to the first embodiment shown in FIG. 1.

In addition, in the first embodiment, the two LED groups 4a and 4b are driven independently of each other. Specifically, the two LED groups 4a and 4b are connected to a lighting circuit 20 that is capable of driving the two LED groups 4a and 4b independently of each other. The lighting circuit 20, as shown in FIGS. 3 and 4, at least has two drive circuit portions 21a and 21b that are individually connected to the two LED groups 4a and 4b, respectively. And the LED group 4a is driven by the drive circuit portion 21a separately from the LED group 4b, and the LED group 4b is driven by the drive circuit portion 21b separately from the LED group 4a.

The drive circuit portion 21a includes a constant current circuit portion 22a and a light control portion 23a, and the drive circuit portion 21b includes a constant current circuit portion 22b and a light control portion 23b. The constant current circuit portion 22a has a function of generating a predetermined constant current. The light control portion 23a has a function of regulating the amount of drive current fed to the LED group 4a (regulating the light amount of the LEDs 4 included in the LED group 4a) according to a light control signal fed from outside. Incidentally, the constant current circuit portion 22b has the same function as the constant current circuit portion 22a described above, and the light control portion 23b has the same function as the light control portion 23a described above.

The lighting circuit 20 of the first embodiment further has, in addition to the drive circuit portions 21a and 21b, a comparator portion 24 and a threshold setting portion 25. The comparator portion 24 has a function of comparing a light control signal fed from outside with a preset threshold and feeding an enable signal to the light control portion 23b connected to the light emitting-diode group 4b. The threshold setting portion 25 has a function of feeding a threshold signal to the comparator portion 24.

Now, the comparator portion 24 is so configured as to generate a high-level enable signal or a low-level enable signal according to a result obtained by comparing a light control signal with the threshold. Specifically, the comparator portion 24 generates a high-level enable signal if the light control signal is equal to or higher than the threshold, and generates a low-level enable signal if the light control signal is lower than the threshold. Furthermore, the light control portion 23b, to which an enable signal is fed, is so configured as to feed a drive current to the LED group 4b when the enable signal is high level, and stop feeding the drive current to the LED group 4b when the enable signal is low level. That is, in the first embodiment, in a case in which it is judged at the comparator portion 24 that the light control signal is equal to or higher than the threshold, the LEDs 4 included in the LED group 4b emit light, and in a case in which it is judged at the comparator portion 24 that the light control signal is lower than the threshold, the LEDs 4 included in the LED group 4b stop emitting light.

The enable signal generated at the comparator portion 24 is not fed to the light control portion 23a connected to the LED group 4a. Thus, the LED group 4a is constantly supplied with a drive current from the light control portion 23a regardless of the light control signal. In other words, the LEDs 4 included in the LED group 4a continuously emit light regardless of the light control signal. Incidentally, the LEDs 4 included in the LED group 4a are low-brightness LEDs 4.

With the backlight unit 10 as described above, it is possible to make, according to the light control signal fed from outside, all the LEDs 4 included in the two LED groups 4a and 4b or only the LEDs 4 included in the LED group 4a emit light. Specifically, in a case in which the light control signal is equal to or higher than the threshold, all the LEDs 4 included in the two LED groups 4a and 4b emit light, and in a case in which the light control signal is lower than the threshold, only the LEDs 4 included in the LED group 4a emit light.

Figure 5:
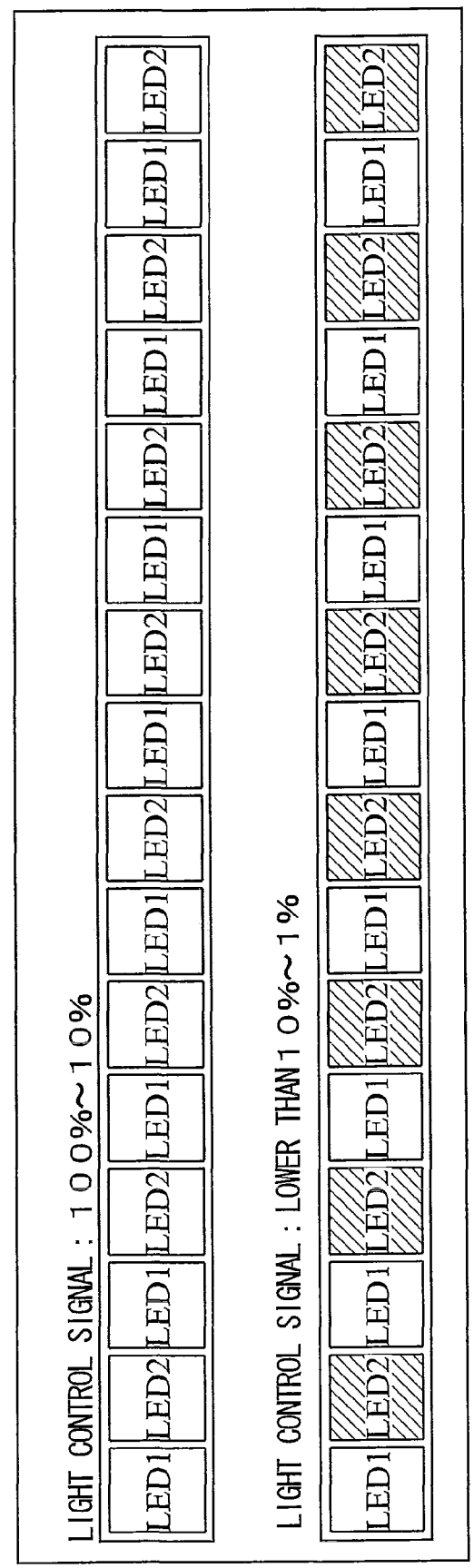
FIG. 5 is a diagram for illustrating lighting operation of the backlight unit according to the first embodiment of the present invention.

Next, with reference to FIGS. 3 to 5, a description will be given of lighting operation of the backlight unit according to the first embodiment. In FIG. 5, "LED 1" denotes an LED 4 included in the LED group 4a, and "LED 2" denotes an LED 4 included in the LED group 4b. In FIG. 5, an LED 4 that is not emitting light is illustrated with hatching, while an LED 4 that is emitting light is illustrated without hatching. In the following description, it is assumed that a maximum-brightness state is a 100%-brightness state and the threshold is 10%.

First, the LED group 4a is constantly supplied with a drive current from the light control portion 23a regardless of the light control signal. Thus, the LEDs 4 included in the LED group 4a continuously emit light regardless of the light control signal.

And, in a case in which the light control signal is between approximately 100% and approximately 10%, the comparator portion 24 judges that the light control signal is equal to or higher than the threshold. Thus, the comparator portion 24 generates a high-level enable signal, and the high-level enable signal is fed to the light control portion 23b. As a result, a drive current is supplied from the light control portion 23b to the LED group 4b, and thus the LEDs 4 included in the LED group 4b emit light.

Thus, in the case in which the light control signal is between approximately 100% and approximately 10%, among the plurality of LEDs 4 forming the light source, all the LEDs 4 included in the two LED groups 4a and 4b emit light. As a result, in the case in which the light control signal is between approximately 100% and approximately 10%, the light amount of the light source composed of the plurality of LEDs 4 is between approximately 100% and approximately 10%.

Also, in a case in which the light control signal is equal to or higher than approximately 1% but lower than approximately 10%, it is judged at the comparator portion 24 that the light control signal is lower than the threshold. Thus, the comparator portion 24 generates a low-level enable signal, and the low-level enable signal is fed to the light control portion 23b. As a result, supply of a drive current from the light control portion 23b to the LED group 4b is stopped, and thus the LEDs 4 included in the LED group 4b stop emitting light.

Thus, in the case in which the light control signal is equal to or higher than approximately 1% but lower than approximately 10%, among the plurality of LEDs 4 forming the light source, only the LEDs 4 included in the LED group 4a emit light. In other words, only half of the plurality of LEDs 4 forming the light source emit light. As a result, in the case in which the light control signal is equal to or higher than approximately 1% but lower than approximately 10%, the light amount of the light source composed of the plurality of LEDs 4 is equal to or higher than approximately 0.5% but lower than approximately 5%.

In the first embodiment, as described above, by using the lighting circuit 20 at least having the drive circuit portions 21a and 21b that are separately connected to the LED groups 4a and 4b, respectively, it is possible to drive the two LED groups 4a and 4b independently of each other. This makes it possible to make all the LEDs 4 included in the two LED groups 4a and 4b emit light and to make only the LEDs 4 included in the LED group 4a of the two LED groups 4a and 4b emit light. For example, assuming that the light control signal is approximately 1.4%, only one half of all the LEDs 4 forming the light source emit light, and the other half of the LEDs stop emitting light. That is, in a case in which the light control signal is approximately 1.4%, the light amount of the light source is approximately 0.7%. In this case, assuming that lighting operation can be stably performed if the control signal is equal to approximately 1.4% or higher, low-brightness lighting operation can be stably performed until the light amount of the light source reaches approximately 0.7%.

Also, in the first embodiment, as described above, the provision of the comparator portion 24 comparing the light control signal with the threshold makes it easy to judge whether to make all the LEDs 4 included in the two LED groups 4a and 4b emit light or to make only the LEDs 4 included in the LED group 4a of the two LED groups 4a and 4b emit light.

Also, in the first embodiment, as described above, by building the LEDs 4 that are included in the LED group 4a and that continuously emit light as low-brightness LEDs 4, it is possible to further reduce the light amount of the light source in low-brightness lighting operation performed by making only the LEDs 4 included in the LED group 4a emit light.

Also, in the first embodiment, as described above, by alternately arranging the LEDs 4 of the LED group 4a and the LEDs 4 of the LED group 4b in the direction (direction A) along the light entrance surface 3a of the light guide plate 3, it is possible to prevent it from happening that light emitting diodes emitting light are concentratedly disposed in a certain location. This helps prevent non-uniformity from occurring in brightness.

(Second Embodiment)

Next, with reference to FIGS. 6 and 7, a description will be given of the structure of a backlight unit according to a second embodiment.

Figure 6:
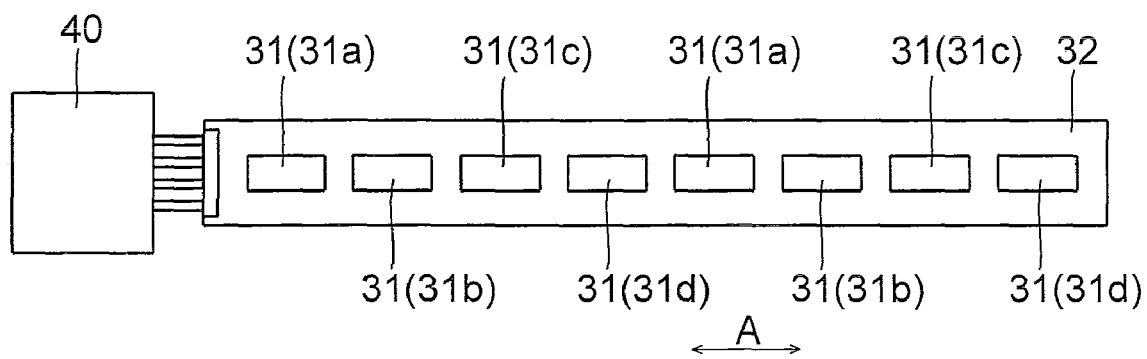
FIG. 6 is a diagram for illustrating the structure of a light source of a backlight unit according to a second embodiment of the present invention.
Figure 7:
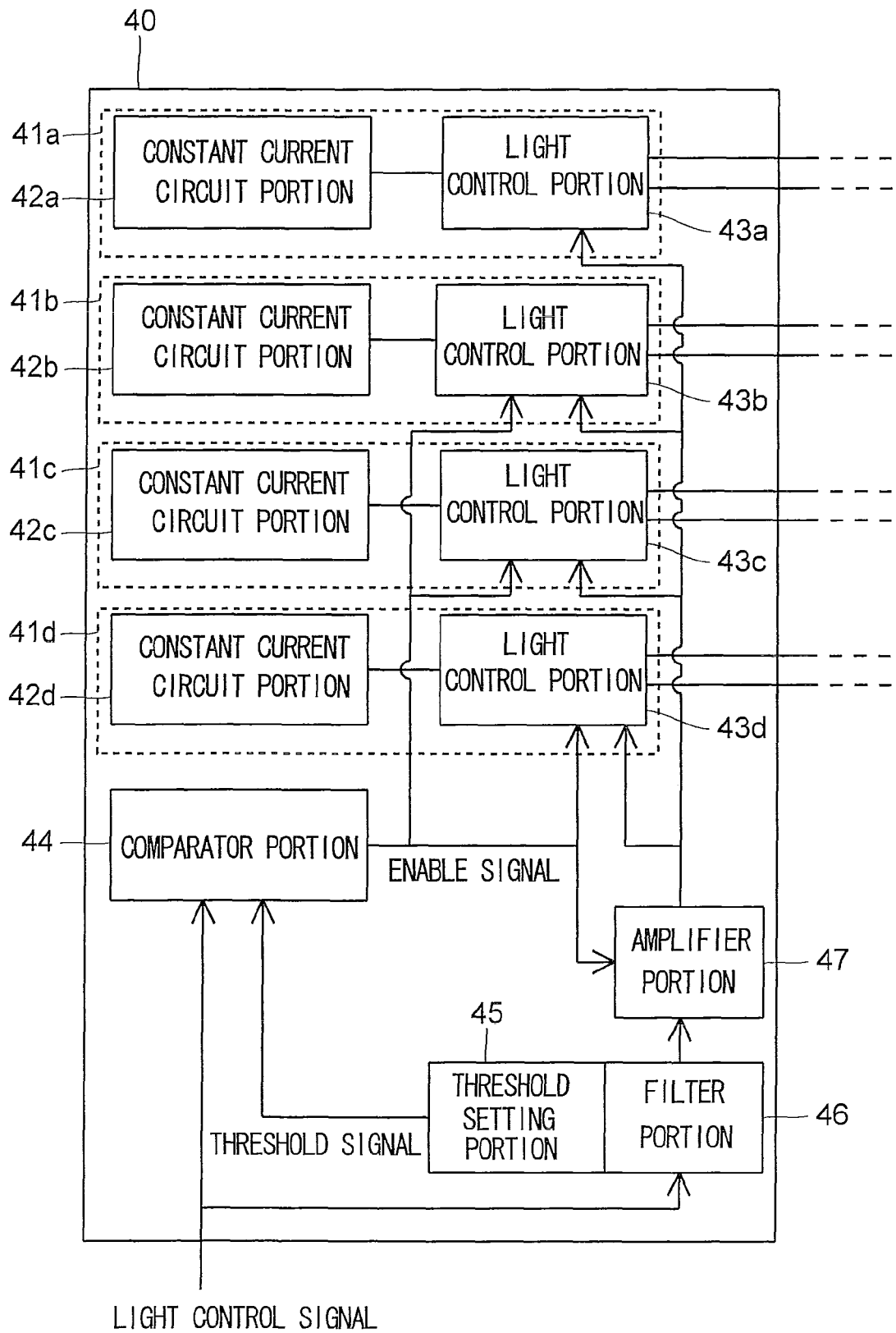
FIG. 7 is a diagram for illustrating the structure of a lighting circuit connected to the light source of the backlight unit according to the second embodiment shown in FIG. 6.

As shown in FIG. 6, a light source of the backlight unit of the second embodiment is composed of a plurality of LEDs (light emitting diodes) 31. The plurality of LEDs 31 are, although not illustrated, arranged in one line at predetermined intervals in a direction A (a direction along a light entrance surface of a light guide plate) such that each of the LEDs 31 faces the light entrance surface of the light guide plate. The plurality of LEDs 31 are mounted on a same LED substrate 32.

Here, in the second embodiment, the plurality of LEDs 31 are classified into four LED groups 31a to 31d. These four LED groups 31a to 31d each include a predetermined number of serially-connected LEDs 31. And the four LED groups 31a to 31d are arranged such that the LEDs 31 included in each of the four LED groups 31a to 31d are alternately arranged in the direction A. Incidentally, for the purpose of simplification of the drawing, conductors for serially connecting a predetermined number of LEDs 31 are not illustrated in FIG. 6.

In the second embodiment, the four LED groups 31a to 31d are connected to a lighting circuit 40 that can drive the four LED groups 31a to 31d independently of one another. As shown in FIGS. 6 and 7, the lighting circuit 40 at least has four drive circuit portions 41a to 41d connected to the four LED groups 31a to 31d, respectively. And the LED group 31a is driven by the drive circuit portion 41a separately from the LED groups 31b to 31d, and the LED group 31b is driven by the drive circuit portion 41b separately from the LED groups 31a, 31c, and 31d. The LED group 31c is driven by the drive circuit portion 41c separately from the LED groups 31a, 31b, and 31d, and the LED group 31d is driven by the drive circuit portion 41d separately from the LED groups 31a to 31c.

The drive circuit portions 41a to 41d include constant current circuit portions 42a to 42d, respectively, and light control portions 43a to 43d, respectively. The constant current circuit portion 42a has a function of generating a predetermined constant current. The light control portion 43a has a function of regulating the amount of drive current fed to the LED group 31a (regulate light amount of the LEDs 31 included in the LED group 31a) according to a light control signal fed from outside. Incidentally, the constant current circuit portions 42b to 42d each have the same function as the constant current circuit portions 42a described above, and the light control portions 43b to 43d each have the same function as the light control portion 43a described above.

The lighting circuit 40 of the second embodiment also has a comparator portion 44 and a threshold setting portion 45. The comparator portion 44 has a function of comparing the light control signal fed from outside with a preset threshold and feeding an enable signal to the light control portions 43b to 43d connected to the light emitting-diode groups 31b to 31d. The threshold setting portion 45 has a function of feeding a threshold signal to the comparator portion 44.

Now, the comparator portion 44 is so configured as to generate, according to a result obtained by comparing the light control signal with the threshold, both a high-level enable signal and a low-level enable signal or only a high-level enable signal or a low-level enable signal. Furthermore, the light control portion 43b, to which the enable signal is fed, is so configured as to feed a drive current to the LED group 31b when the enable signal is high level, and to stop feeding the drive current to the LED group 31b when the enable signal is low level. The light control portions 43c and 43d each have the same function as the light control portion 43b described above. Thus, with the second embodiment, it is possible, according to the result obtained by comparing the light control signal with the threshold, to make all the LEDs 31 included in the LED groups 31b to 31d emit light, to make only the LEDs 31 included in one of the LED groups 31b to 31d emit light, or to make all the LEDs 31 included in the LED groups 31b to 31d stop emitting light.

The enable signal generated by the comparator portion 44 is not fed to the light control portion 43a connected to the LED group 31a. Thus, the LED group 31a is constantly supplied with a drive current from the light control portion 43a regardless of the light control signal. In other words, the LEDs 31 included in the LED group 31a continuously emit light regardless of the light control signal.

The lighting circuit 40 of the second embodiment also has a filter portion 46 and an amplifier portion 47. The filter portion 46 has a function of removing noise from the light control signal to be fed to the amplifier portion 47. The amplifier portion 47 has a function of amplifying the light control signal according to the enable signal fed from the comparator portion 44. The light control signal is fed to the light control portions 43a to 43d after being subjected to the processing by the filter portion 46 and by the amplifier portion 47.

In the other respects, the structure of the second embodiment is similar to that of the above-described first embodiment.

Figure 8:
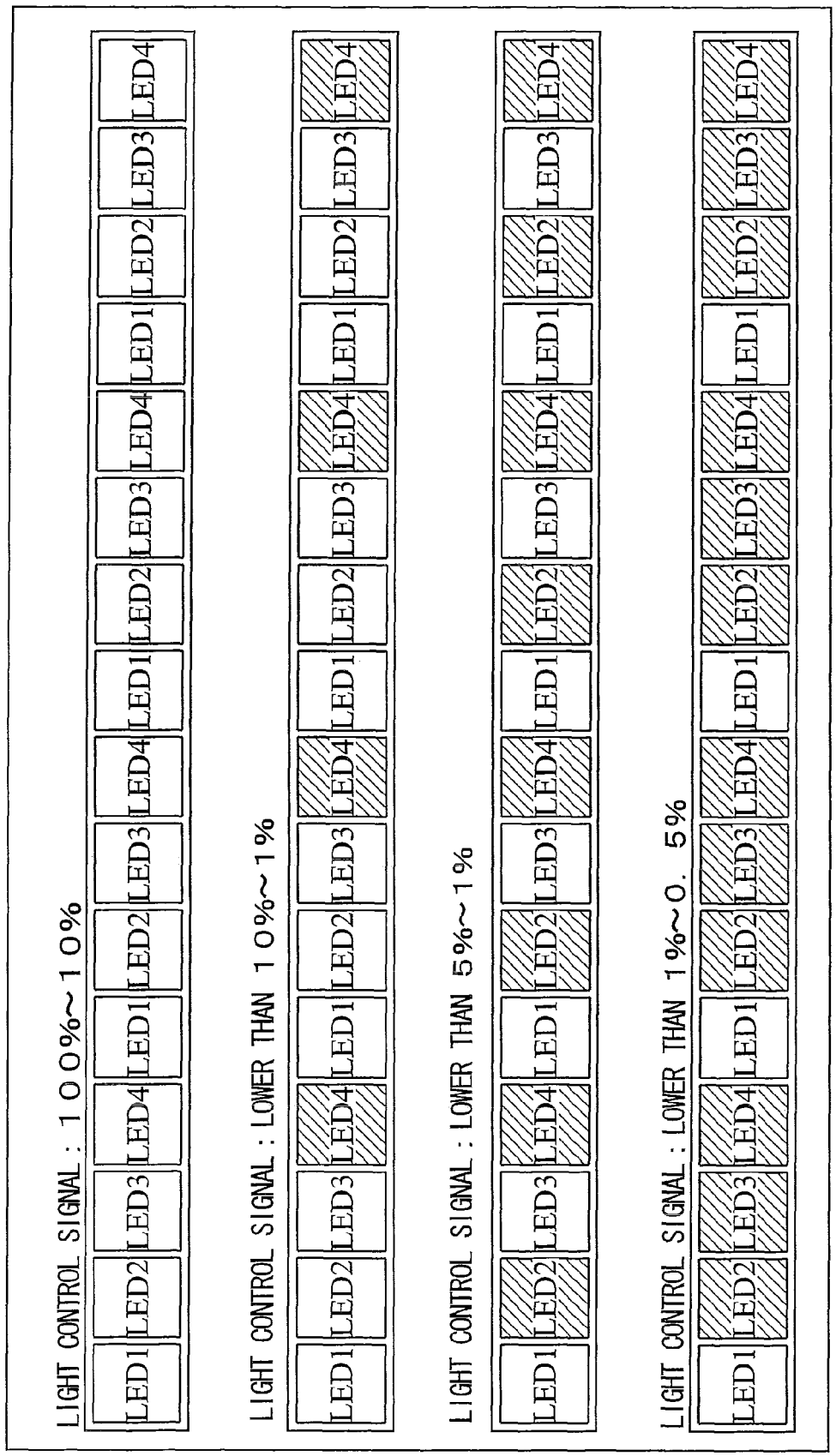
FIG. 8 is a diagram for illustrating lighting operation of the backlight unit according to the second embodiment of the present invention.
Figure 9:
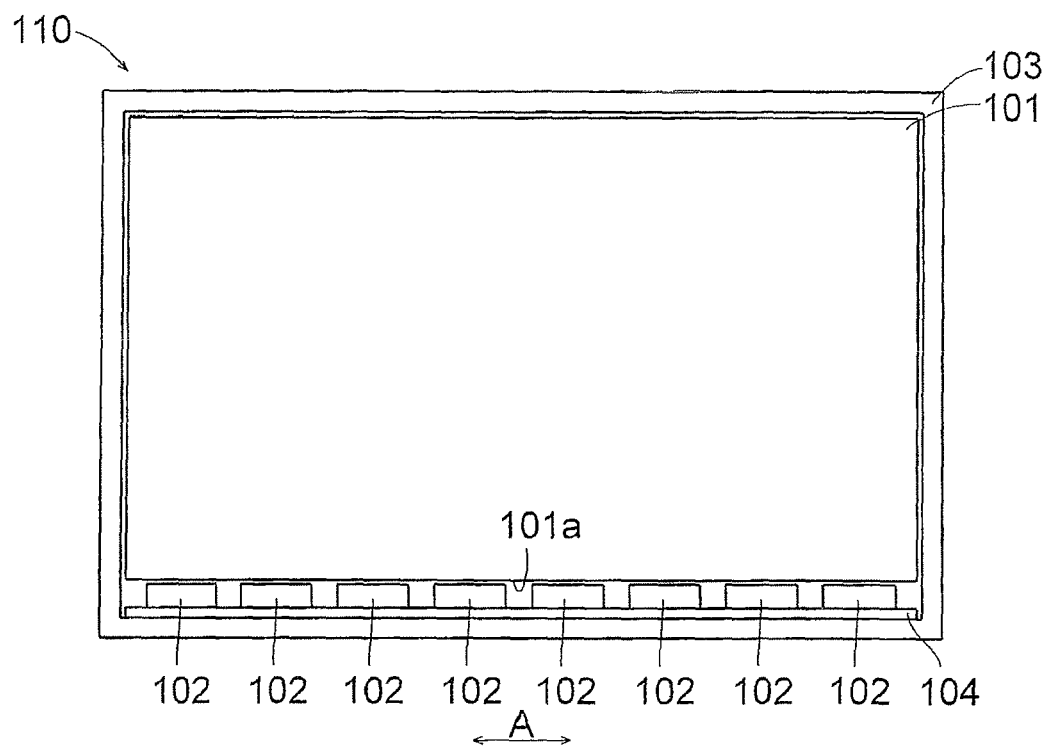
FIG. 9 is a plan view schematically showing an example of the structure of a conventional backlight unit.
Figure 10:
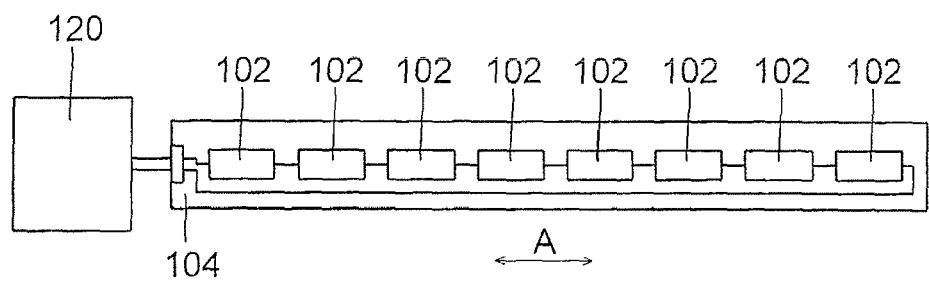
FIG. 10 is a diagram for illustrating the structure of a light source of the conventional backlight unit shown in FIG. 9.
Figure 11:
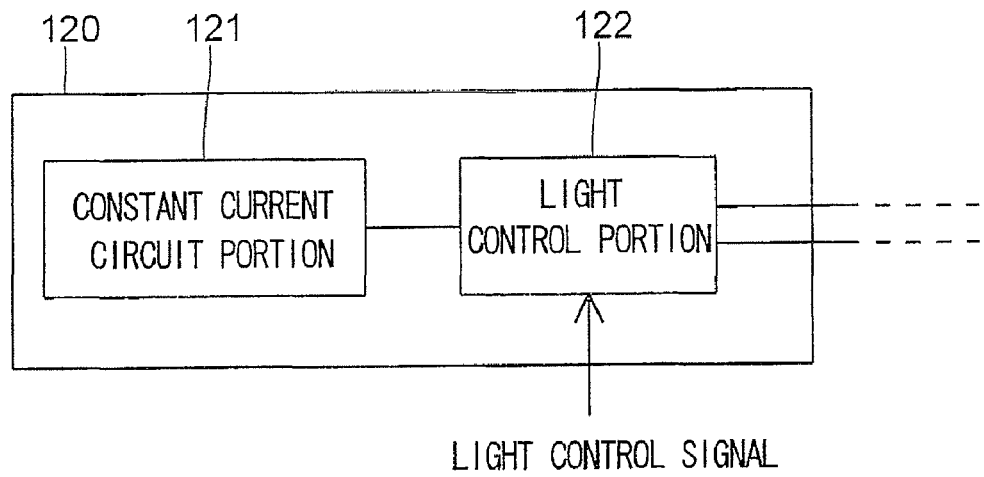
FIG. 11 is a diagram for illustrating the structure of a lighting circuit connected to the light source of the conventional backlight unit shown in FIG. 9.

Next, with reference to FIGS. 6 to 8, a description will be given of lighting operation of a backlight unit according to the second embodiment. In FIG. 8, "LED 1" denotes an LED 31 included in the LED group 31a, and "LED 2" denotes an LED 31 included in the LED group 31b. In FIG. 8, "LED 3" denotes an LED 31 included in the LED group 31c, and "LED 4" denotes an LED 31 included in the LED group 31d. In FIG. 8, an LED 31 that is not emitting light is illustrated with hatching, while an LED 4 that is emitting light is illustrated without hatching. In the following description of operation, it is assumed that a maximum-brightness state is a 100%-brightness state and thresholds are 10%, 5%, and 1%.

First, the LED group 31a is constantly supplied with a drive current from the light control portion 43a regardless of the light control signal. Thus, the LEDs 31 included in the LED group 31a continuously emit light regardless of the light control signal.

In a case in which the light control signal is between approximately 100% and approximately 10%, the comparator portion 44 generates only a high-level enable signal, and the high-level enable signal is fed to the light control portions 43b to 43d. As a result, a drive current is supplied from the light control portions 43b to 43d to the LED groups 31b to 31d, and thus the LEDs 31 included in the LED groups 31b to 31d emit light.

Thus, in the case in which the light control signal is between approximately 100% and approximately 10%, among the plurality of LEDs 31 forming the light source, all the LEDs 31 included in the LED groups 31a to 31d emit light. In this case, amplification of the light control signal is not performed at the amplifier 47.

In a case in which the light control signal is equal to or higher than approximately 5% but lower than approximately 10%, the comparator portion 44 generates both a high-level enable signal and a low-level enable signal, to feed the high-level enable signal to the light control portions 43b and 43c, and the low-level enable signal to the light control portion 43d. Thus, since a drive current is supplied from the light control portions 43b and 43c to the LED groups 31b and 31c, the LEDs 31 included in the LED groups 31b and 31c emit light. On the other hand, no drive current is supplied from the light control portion 43d to the LED group 31d, and thus the LEDs 31 included in the LED group 31d do not emit light.

As a result, in the case in which the light control signal is equal to or higher than approximately 5% but lower than approximately 10%, among the plurality of LEDs 31 forming the light source, only the LEDs 31 included in the LED groups 31a to 31c emit light. In other words, only 3/4 of the plurality of LEDs 31 forming the light source emit light, the light amount of the light source composed of the plurality of LEDs 31 is reduced to 3/4 times. Incidentally, in this case, the amplifier 47 amplifies the light control signal by a factor of 4/3.

In a case in which the light control signal is equal to or higher than approximately 1% but lower than approximately 5%, the comparator portion 44 generates both a high-level enable signal and a low-level enable signal, to feed the high-level enable signal to the light control portion 43c, and the low-level enable signal to the light control portions 43b and 43d. Thus, since a drive current is supplied from the light control portion 43c to the LED group 31c, the LEDs 31 included in the LED group 31c emit light. On the other hand, no drive current is supplied from the light control portions 43b and 43d to the LED groups 31b and 31d, and thus the LEDs 31 included in the LED groups 31b and 31d do not emit light.

As a result, in the case in which the light control signal is equal to or higher than approximately 1% but lower than approximately 5%, among the plurality of LEDs 31 forming the light source, only those included in the LED groups 31a and 31c emit light. In other words, only 2/4 of the plurality of LEDs 31 forming the light source emit light, and thus the light amount of the light source composed of the plurality of LEDs 31 is reduced to 2/4 times. Incidentally, in this case, amplification of the light control signal is performed at the amplifier 47 to amplify the light control signal by a factor of 2.

In a case in which the light control signal is equal to or higher than approximately 0.5% but lower than approximately 1%, the comparator portion 44 generates only a low-level enable signal and the low-level enable signal is fed to the light control portions 43b to 43d. Thus, since no drive current is supplied from the light control portions 43b to 43d to the LED groups 31b to 31d, the LEDs 31 included in the LED groups 31b to 31d do not emit light.

As a result, in the case in which the light control signal is equal to or higher than approximately 0.5% but lower than approximately 1%, among the plurality of LEDs 31 forming the light source, only those included in the LED group 31a emit light. In other words, only 1/4 of the plurality of LEDs 31 forming the light source emit light, and thus the light amount of the light source composed of the plurality of LEDs 31 is reduced to 1/4 times. Incidentally, in this case, amplification of the light control signal is performed at the amplifier 47 so as to amplify the light control signal by a factor of 4.

In the other respects, the structure of the second embodiment is similar to that of the above-described first embodiment.

The embodiments disclosed herein are to be considered in all respects as illustrative and not restrictive. The scope of the present invention is set out in the appended claims and not in the descriptions of the embodiments hereinabove, and includes any variations and modifications within the sense and scope equivalent to those of the claims.

For example, in the above-described embodiments, the plurality of LEDs are classified into two or four LED groups, but this is not meant to limit the present invention, and the plurality of LEDs may be classified into three LED groups, or into five or more LED groups.

Furthermore, the light control signal is not subjected to noise removal processing or amplification in the above-described first embodiment, but this is not meant to limit the present invention, and the light control signal may be subjected to noise removal processing and amplification as in the above-described second embodiment.

Moreover, the light control signal is subjected to noise removal processing or amplification in the above-described second embodiment, but this is not meant to limit the present invention, and the light control signal may not be subjected to noise removal processing or amplification as in the above-described first embodiment.

The invention claimed is:

1. A backlight unit, comprising:
a light source formed with a plurality of light emitting-diode groups each including a predetermined number of serially-connected light emitting diodes; and
a lighting circuit that is connected to the light source to light the light source according to a received light control signal,
wherein
the lighting circuit at least has a plurality of drive circuit portions individually connected to the plurality of light emitting-diode groups, and
the lighting circuit is so configured to switch between, according to the light control signal, all light emitting diodes included in the plurality of light emitting-diode groups or only light emitting diodes included in a predetermined light emitting-diode group of the plurality of light emitting-diode groups emitting light, wherein light emitting diodes included in one light emitting-diode group of the plurality of light emitting-diode groups are so configured as to continuously emit light regardless of the light control signal, wherein
the light emitting diodes are classified into a low-brightness light emitting diode and a high-brightness light emitting diode having emission brightness higher than emission brightness of the low-brightness light emitting diode, and
the light emitting diodes that are included in the one light emitting-diode group of the plurality of light emitting-diode groups and that are so configured as to continuously emit light are the low-brightness light emitting diode.

2. The backlight unit of claim 1, wherein the plurality of light emitting-diode groups are configured to be driven independently of one another.

3. The backlight unit of claim 1,
wherein
the lighting circuit further has a comparator portion comparing the light control signal with a preset threshold, and
the lighting circuit is so configured as to make, according to a result of comparison between the light control signal and the threshold, all light emitting diodes included in the plurality of light emitting-diode groups or only light emitting diodes included in a predetermined light emitting-diode group of the plurality of light emitting-diode groups emit light.

4. The backlight unit of claim 1, wherein the plurality of light emitting-diode groups are arranged such that light emitting diodes included in the plurality of light emitting-diode groups are alternately arranged in a predetermined direction.

* * * * *